Nov. 12, 1929.                J. H. STRINGHAM                1,735,840
                     TRANSMISSION FOR MOTORS OR ENGINES
                      Original Filed Jan. 29, 1923    3 Sheets-Sheet 1

INVENTOR
John H. Stringham
BY
Philip Farnsworth
ATTORNEY

Nov. 12, 1929.  J. H. STRINGHAM  1,735,840
TRANSMISSION FOR MOTORS OR ENGINES
Original Filed Jan. 29, 1923    3 Sheets-Sheet 3

INVENTOR
John H. Stringham
BY
Philip Farnsworth
ATTORNEY

Patented Nov. 12, 1929

1,735,840

UNITED STATES PATENT OFFICE

JOHN H. STRINGHAM, OF JERSEY CITY, NEW JERSEY, ASSIGNOR OF ONE-THIRD TO CHARLES H. GOOD, OF JERSEY CITY, NEW JERSEY; JOHN H. STRINGHAM ADMINISTRATOR OF SAID JOHN H. STRINGHAM, DECEASED

TRANSMISSION FOR MOTORS OR ENGINES

Original application filed January 29, 1923, Serial No. 615,468. Divided and this application filed July 5, 1924. Serial No. 724,239.

This invention relates to improvements useful with engines or motors of any and all kinds of the reciprocating piston type, including those producing power from the pressure of water.

This application is a division of my application Serial No. 615,468, filed 29 January, 1923.

The object of the invention is an apparatus for the economical production of mechanical power from fluid pressure, more particularly the pressure of water in places where only water pressure is available or most conveniently utilizable for power purposes, but such apparatus may be employed in connection with steam or compressed air wherever such source of power may be convenient or desirable for use.

The invention consists of the apparatus disclosed herein and resides in like apparatus embodying the principles of the invention.

The invention claimed herein relates more particularly to the amplifying apparatus for the short stroke piston of the engine, which latter preferably is of high-speed and therefore high power and operable by low water pressures.

Figure 1:
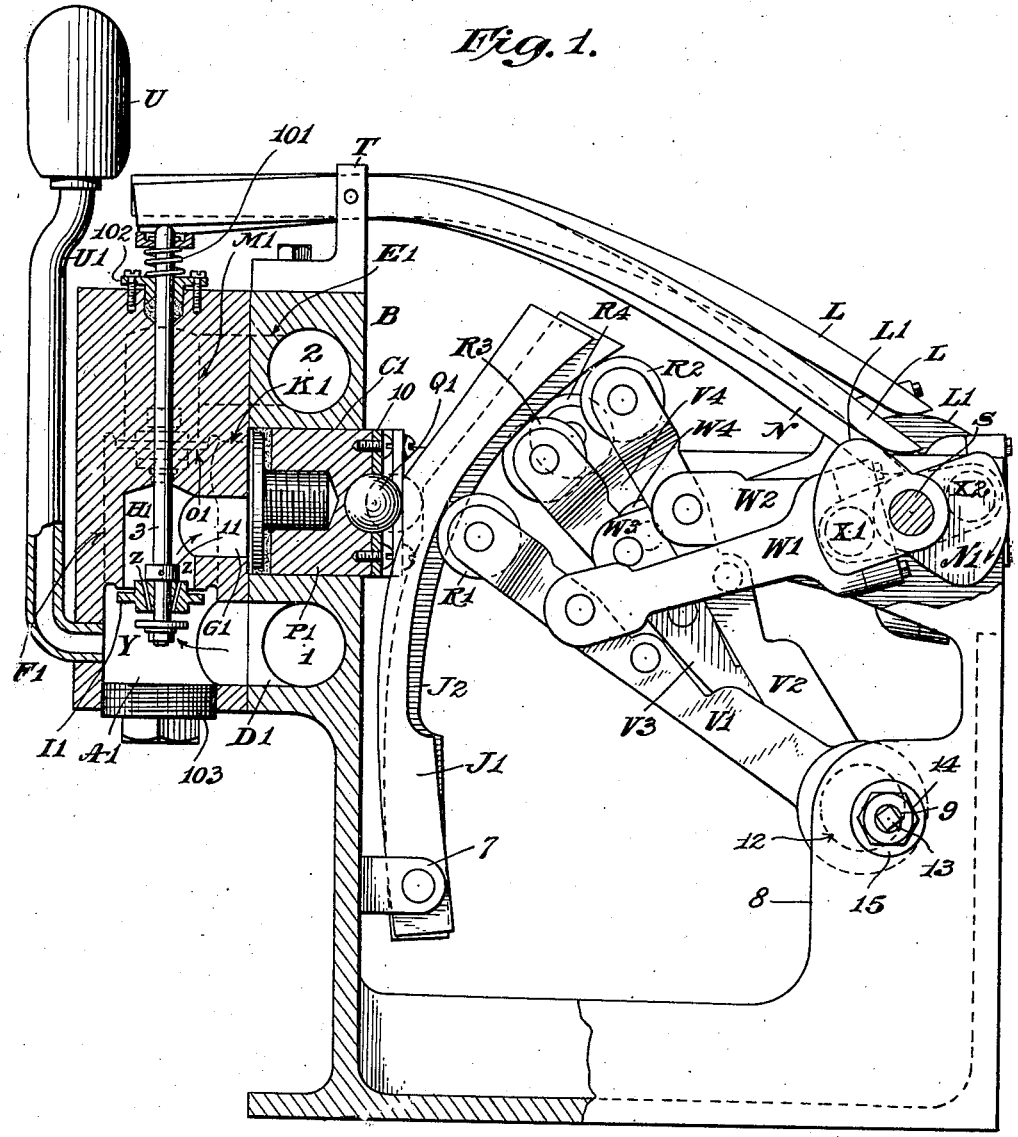
Figure 2:
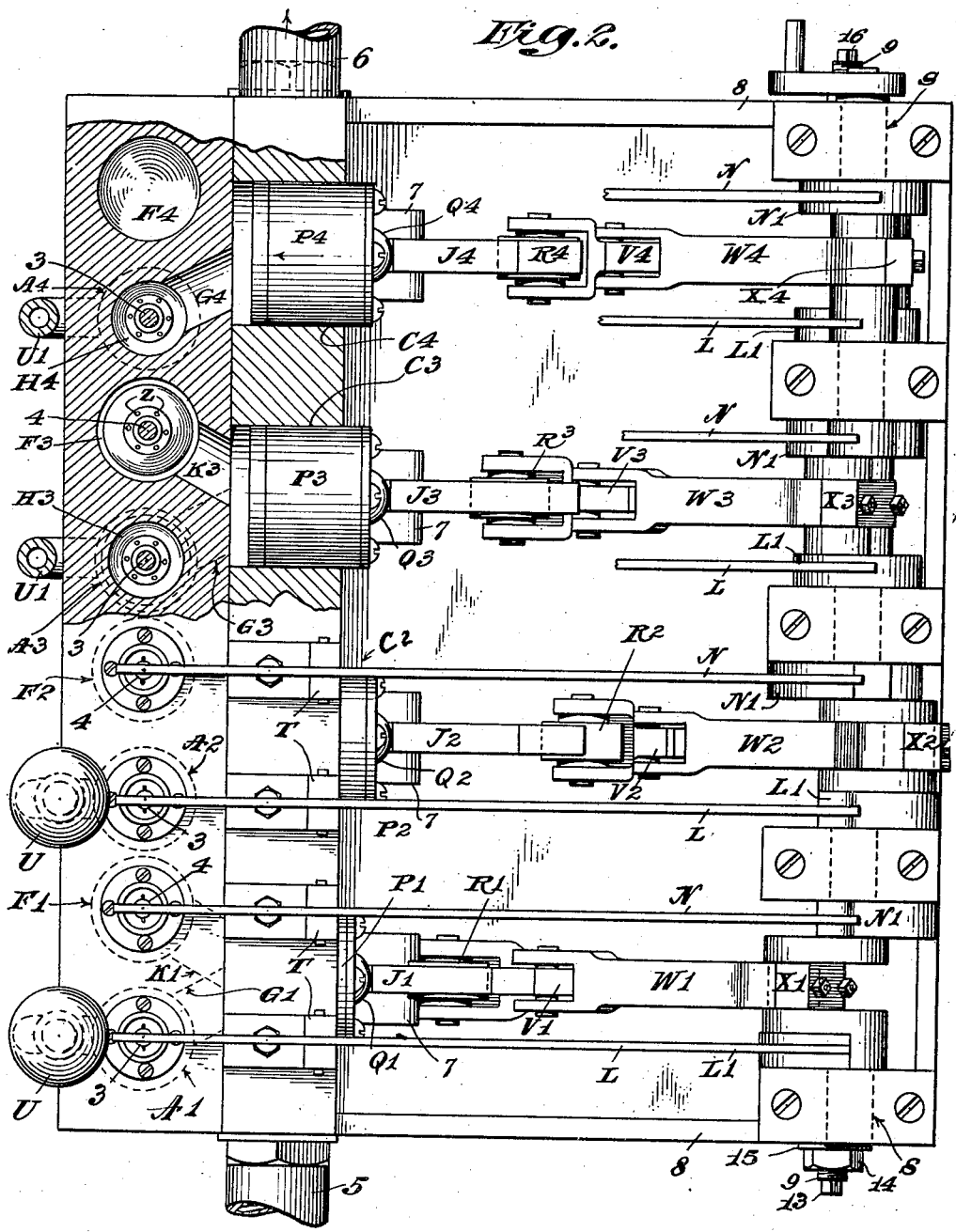

Of the drawings, Figures 1 and 2 show a practical embodiment of the invention, Fig. 1 being a side elevation of the mechanical amplifying apparatus, illustrating its combination with the engine which is shown largely in section; Fig. 2 being a plan of the apparatus shown in Fig. 1 and like Fig. 1 showing the location of the amplifying apparatus between the engine piston and crank-shaft and its connection thereto respectively; and Fig. 3 is an elevation of another practical embodiment, being a view like Fig. 1.

Figure 3:
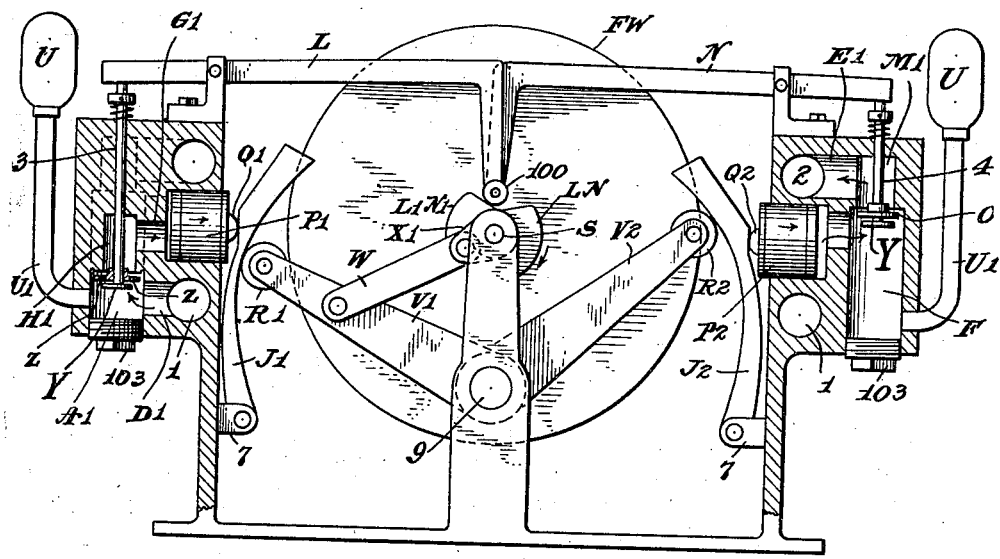

Figs. 1–2 are two-thirds full scale in the drawings sent with this application, and Fig. 3 of the same is one-third full scale.

The form of Figs. 1–2 is especially designed for the utilization of water-pressure as the source of power, but may be used advantageously with steam or compressed air; and the same is true of the apparatus of Fig. 3.

An important object and result of this invention, involving the amplifying transmission, is the great economy which is effected in the volume of water, etc., which is employed to produce the mechanical power, and/or the gain in power from a given volume of the operating fluid.

This increased production of power per volume of the water is obtained as the result of the apparatus hereof including the amplifying transmission whereby there is obtained from the water pressure a high speed of reciprocation of the piston and generally of rotation of the driven shaft, as distinguished from the slow speed rams and turbines using substantially greater volumes of water. For example, thus far in practice, a speed of twelve revolutions per second (using 30–40 pounds water pressure alone) has been obtained with an engine constructed and operated in accordance with this invention (the piston having a quarter inch stroke), employing my amplifying transmission. High water pressure is not required with this invention. An efficient embodiment operates perfectly at about forty pounds pressure, more or less. Also, while the best results follow the use of a plurality of cylinders and pistons operating successively, yet a single cylinder and piston constitute a fully operative form. The method of this invention consists, briefly speaking, in imparting by a fluid under low pressure to the piston a reciprocation too short to be translated directly into rotary motion, then very greatly amplifying such motion, and translating that amplified motion into rotary motion. The result of this mode of operation, involving the short piston stroke, and therefore requiring the amplifying means of the claims hereof, is the ability to provide an engine which is capable of high speed from low fluid-pressure, as stated, and which therefore, although a water motor, possesses all the advantages as to high power, of any high speed motor such as those of the explosive type, or the light high speed steam type, or the small electric motor type, as used in motor vehicles and the like. In short, by the employment of the short piston-stroke and the amplification thereof, the invention makes possible the production of a high speed water motor which in various other respects resembles the ordinary reciprocating engines of other types. The short piston-stroke involves such a small volume of water that not only can the water be discharged from the cylinder after the power stroke with sufficient rapidity to permit high speed operation, but such rapid discharge can be made through valves or openings which are made smaller than the cylinder itself, as in the ordinary reciprocating engine and as distinguished from practical water motors heretofore used. It is such short piston stroke which is made practicable by the amplifying transmission of the claims.

In Fig. 1, a form is shown wherein a power stroke is given to the pistons in only one direction. The cylinder block B is shown at the left in section. At the right are shown in section the main drive shaft S and (in full lines) a form of the special amplifying transmitting mechanism between the pistons P and main shaft S. Shaft S is shown as being borne by engine frame 8.

One of the cylinders is indicated at C1 (Fig. 1), containing piston P1. There are four cylinders (C1, C2, C3, C4) in this form (Fig. 2).

At 1 is a common inlet passage communicating with four supply passages D1—D4 for the four cylinders. These inlet passages communicate respectively with lower chambers or passages A1—A4, which in turn communicate respectively via inlet valves I1—I4 which control the inlets to upper chambers H1—H4. When valves I1—I4 are open, the pressure acts on pistons P1—P4 through passages G1—G4 between upper chambers or passages H1—H4 and cylinders C1—C4.

It is to be observed particularly (Fig. 1) that the pistons have extremely short strokes, as one-quarter inch in the example shown. This is important in connection with the amplifying transmission means between the pistons and the crank shaft S, to be described. Such amplifying transmission means and the extremely short strokes of the pistons have relation to the high speed operation of the pistons and to the economy in the volume of the power medium employed, such as water. The short piston stroke is provided, as shown, by the valve operation and is effectuated by the construction, location and arrangement of the amplifying transmission between piston and drive shaft S. By the amplifying means hereof, it is practicable to translate into rotary motion, with very little loss and at high efficiency, the extremely short rectilinear motion of the power strokes of the pistons (see Fig. 1, between a piston P1 and crank-shaft S).

From the four cylinders (C1, etc., Fig. 2) extend four water-exhaust passages K1—K4 to chambers M1—M4 and exhaust outlets E1—E4 to main exhaust passage 2 in cylinder block B. These passages and outlets are permitted to be of not excessive diameter on account of the short strokes of the piston. The exhausts are controlled by outlet valves O1—O4, as in an ordinary engine.

To the main inlet passage 1 in cylinder block B (Fig. 1) is connected a main inlet pipe 5 (Fig. 2); and to main exhaust passage 2 (Fig. 1) is connected a main exhaust pipe 6 (Fig. 2). (While slide valves may be employed, yet those shown by way of illustration in Fig. 1 are of the poppet type.) The details of suitable valves are shown in the drawings.

In Figs. 1–2, the center of shaft S is in the same plane as the center of the pistons, but at right angles thereto.

The amplifying mechanism employed to transmit power from the short-stroke pistons to main shaft S is shown in elevation in Fig. 1 and in plan in Fig. 2. It is adapted to the extremely short stroke of the piston, which in the example disclosed (now in practical operation) is only one-quarter inch, so that it is impossible to cause the pistons to drive the shaft by way of the ordinary connection direct to a crank X1 of shaft S.

While engine-operation by pressure is usual, yet the operation with the extremely short-stroke pistons of this invention is such as to obtain relatively high mechanical power in a water motor by high speed operation and with the use of only extremely small volume of the power medium, and at low pressure, and all this is permitted by the mechanical amplifying means now to be described. It will be understood that the principal advantages of the invention, so far as concerns the production of relatively large amounts of power from a given small volume of low-pressure water, are involved in a high speed water motor; and it is just such a motor which is made possible by this invention.

In each piston is supported a ball Q1—Q4 (which may be a roller) fitted therein but free to be rotated. Engaging the four balls Q1—Q4 are four curved levers J1—J4 pivoted at their lower ends in fixed bracket 7 and constructed with concave surfaces (to be described later in detail) facing shaft S. The movable ends of levers J1—J4 are held between the balls or rollers Q1—Q4 on one side (the left), and are held on the other side (right or concave side) by four rollers R1—R4 respectively (which may be balls like balls Q). Rollers R1—R4 are carried by further mechanism at the right connected to drive crank-shaft S. When one of the pistons P is forced towards shaft S, it acts through a ball Q1 to swing lever J1 on its pivot 7. Such swing causes roller R1 to move a relatively great distance, i. e., to the position shown of another roller R2. This action is due to the curvature of lever J1, roller R1 which engages such curvature being mounted on the end of a lever V1 pivoted at 9. This operation, repeated successively by the four sets of pistons, balls, curved levers and rollers, causes a complete rotation of shaft S. The movement of piston-roller Q1 on the left of curved lever J1 is very slight, but it effects a relatively enormous movement of roller R1 carried by lever V1. The back stroke of each piston is effected in Figs. 1-2 by reverse action of the system of levers under impulsion of shaft S and the corresponding crank thereon, permissively aided by a fly-wheel on shaft S (Fig. 3), although a fly-wheel is not necessary. A suitable fly-wheel on shaft S of Figs. 1-2, if used, is one weighing about twelve pounds.

The four levers V1—V4 (in the ends of which rollers R1—R4 are mounted) are pivoted at their lower ends at 9 to engine frame 8. Pitmen W1—W4 (connecting levers V1—V4 to the cranks of shaft S) are pivoted to said levers V1—V4 intermediate the ends of the latter. (The pivot points of levers V1—V4 may be, preferably are and are shown as, at or about the level of the pivot points of curved levers J1—J4). The connecting pitmen W1—W4, at their ends opposite to those pivoted to levers V1—V4, have connections respectively with the four cranks X1—X4 of shaft S (Fig. 2), disposed ninety degrees apart around the shaft. Thus four amplified power impulses are transmitted to the shaft at each revolution, and each piston is given its back stroke by the operation of the other pistons.

The concave curved surface of each of the four levers J1—J4 on their sides toward shaft S is such that in the lowest position of each roller (at position R1), the point of engagement of the roller and curved surface is below a line between the center of the roller (as R1) and the pivot point 9 of its lever V1 (to avoid dead-center at commencement of piston-stroke). Thus on the forward movement of piston P1 (to the right), lever V1 is swung up on its pivot, carrying its roller (as R1) from the lowest position up to the position of R2 shown. When each roller is forced down from position R4 to position R1, by shaft S acting reversely through the system of levers, the piston thereby is given its back stroke, the roller moving down to swing curved lever J1 back to the left and forcing it against ball Q to give piston P1 its back stroke.

The common fulcrum of levers V1—V4 (Fig. 1) comprises a shaft 9 mounted in the side walls of engine frame S. Fulcrum 9 has four disks, one of which is shown at 12 (Fig. 1), eccentrically mounted on it. The ends of fulcrum 9 are squared as at 13 and 16 (Figs. 1-2). This provides means for adjusting disks 12 and levers V1—V4 pivoted thereto. The ends of shaft 9 inside its squared ends are threaded and provided with nuts 14 and 17 (Fig. 1) and washers 15 and 18, thereby providing for the clamping of shaft 9 to secure the adjustment in any desired position of the parts. Such adjustment is employed usually only upon assembly or installation.

As demonstrated in practice, this motor can start under load.

As shown in Fig. 1, ball Q1 engages a flat surface on the left of lever J1, which surface is at right angles to the direction of movement of the piston. The ball thereby prevents side thrust on the piston. In operation, the movement of ball Q1 is very slight on account of the extremely short stroke of the piston and the resulting short movement of the surface of lever J1 which is engaged by the ball. The amplification begins to be effectuated only at the curvature of lever J1 on its side opposite to ball Q1, where said lever engages roller R1. The provision of a ball or roller Q1, however, notwithstanding the small motion thereat, is extremely valuable in ensuring against the piston (or a member constructed with and operated by it) digging into the metal of lever J1 when the piston moves forward against the load; and such balls Q1 also are desirable in order to prevent side thrusts of the pistons when acting on the curved levers. The preferred arrangement with the balls is, for these reasons, where, as shown, curved lever J1 is mounted independent of the piston and is acted on by the piston via a ball Q1. Also, as shown, the pivoting of the lower end of J1 is a convenient and desirable way of supporting it.

On account of the considerable strain between piston P1 and curved lever J1, it is important to provide some such solid mounting of ball Q1 as that shown, where each ball Q1—Q4 is held in a massive member such as in the piston itself, as by a metal cap 10 secured to the end of the piston.

Rollers R1—R4 (between levers J1—J4 and V1—V4) also are important in order to permit the load and transmitting mechanism to yield readily to the movement of levers J1—J4, without undue friction, and in general to facilitate the movements of the free ends of pivoted lever V1 in both directions over the curved surface of lever J1, that being the critical location or phase of the translation from slight to ample motion and vice versa. The lowermost position of rollers R1—R4 is below a line between the centers of the pistons and shaft S.

The curvature of the concave surfaces of levers J1—J4 (when they are pivoted, as shown) is somewhat of a departure from a circle about the pivot 9 of levers V1—V4 as a center; i. e., the point of the curve which is engaged by roller R2, in the uppermost position shown, is (at a given position of lever J1) further from the pivot 9 of lever V1 than is the point engaged by roller R1 in the lowermost position shown. This particular curvature is due to the extra movement of the free end of lever J1 above balls Q1 due to the fact, as is preferred, that said lever J1 is pivoted at a point below ball Q1 as shown. The curvature in any case is that which is desirable to progressively advance the free end of pivoted lever V1 along the forward cam surface of amplifying lever J1. (The lowermost position R1 of rollers R1—R4 may be lower than that shown, in order to provide for a longer stroke of the piston, when that is desired; and such lower initial position can be obtained by a connection of pitman W1 to lever V1 at a point nearer to the pivot of lever V1 than that shown, as at the point indicated by the circle at the middle of lever V1.)

It is evident that by the above amplifying transmitting mechanism between the pistons and drive shaft S, the extremely short stroke of the piston (which may be too short to permit effective ordinary or direct crank connection) results in transmission of the power in a practical manner to shaft S. In fact, this is the mechanism which now is in successful use, and is the preferred mechanism, although an equivalent of amplifying member J1 shown in the figures may be employed, if desired.

By such amplifying transmission, a piston stroke as short as, say, a quarter-inch, gives an inch and a half swing to a three-quarter inch crank X1, in actual operation of the apparatus shown in Figs. 1 and 2.

In this form, the return stroke of each piston is effected by the forward strokes of the other pistons even without the employment of a fly-wheel.

Summarizing generally, the operation, as to the valves and pistons, of Figs. 1–2 is as follows, being substantially the same for all forms shown. This description is limited, for brevity, to one piston, which in fact constitutes an operative apparatus.

1. The operator opens the throttle (not shown) in input pipe 5 (Fig. 2) to passage 1 (Fig. 1).
2. Thereupon the water pressure is communicated to piston P1 via water standing in passages 1 and D1 (Fig. 1) and in lower chamber A1 via open water valve I1 to the water standing in upper chamber H1 and passage G1, the pressure being thence communicated to piston P1.
3. Inlet valve I1 is closed at about the end of the resulting power stroke of the piston.
4. Outlet valve O1 is opened by the terminating portion of the same power stroke.
5. The back stroke of the piston drives the excess used water out around open outlet valve O1, the amount of water being small on account of the short piston-stroke, and therefore being quickly discharged through a practicably small outlet around valve O1. The water thence is discharged through chamber M1 and passages E1 and 2.
6. Outlet valve O1 is closed and the opening of relief valve Y is commenced at about the end of the back stroke of the piston; and
7. Relief valve Y is fully opened, closely followed by the opening of main inlet valve I1, by the terminating portion of the back stroke of the piston.

The construction and timing of the valves are required to be accurate, on account of the short time allowed for their due and timely action by the short and rapid piston strokes and on account of the incompressibility of the water; but in practice this matter has been proved not to be one of particular difficulty, and to require no more than ordinary mechanical skill and workmanship.

The operation of this engine is similar for any type of reciprocating piston engine, whatever to be the motive force. The beneficial operation is an accompaniment and result of the short strokes of the pistons provided, which is obtainable, as a practical matter, by the amplifying transmission. The advantages are especially great in the use of water under pressure at locations where neither steam nor compressed air is available; although the engine is useful with either steam or compressed air, so that the motor can be employed wherever such powers are available and desired to be used.

In the example disclosed, a piston of approximately two inches diameter is used with a one-inch water supply pipe. With the same one-inch supply, an excessive increase in diameter of the pistons will cause a reduction of the speed of the piston, but an increase in the power, it being an hydraulic principle of my water motor that the pistons shall be of substantially greater diameter than the water-supply, just as the exhaust outlet is substantially smaller in diameter than the cylinder. The engines of Figs. 1–3 are high speed motors, preferably for comparatively small powers; although they may be operated economically (as to volume of water and proportionate power produced) at low speed by throttling the intake, or even (with equal economy of water) by being designed and proportioned for lower speed operation, as by providing larger cylinders and pistons for a given diameter of intake and a given pressure.

On account of the extremely short stroke of the pistons, only a small quantity of water is discharged by the exhaust stroke. The piston stroke is much less than the diameter of the piston, not only because the piston diameter is not small in proportion to the general dimensions of a motor of given size and power, but because the stroke always is short enough to produce the desired high-power and high speed effect from water pressure.

An illustration of the beneficial operation is afforded by the following comparison. Take, on the one hand, an engine with a single piston having an inch and a half stroke and crank-connected in any ordinary way (as in a water-ram). Compare this with an engine of my type having six pistons, each having a stroke of one-quarter inch, such engine having the mechanical amplifying means necessary to translate such short rectilinear motion into rotary motion. This illustration is to shown the greater amount of power obtained by my engine, although the following conditions are identical in each case, i. e., time of rotation of driven shaft, piston diameter (two inches), water pressure forty pounds per square inch, and, of course, the same amount of water displaced per each revolution of the drive shaft (the stroke of the single piston being 1½″ and the sum of the strokes of the six pistons in the other case being 1½″). In the case of the single-piston engine, the total pounds working pressure is 160, but the working pressure or effective power is 960 pounds in the case of the six-piston engine with short stroke and amplifying means (the total working pressure or power being calculated by multiplying the area of the piston roughly by the initial pressure).

The operation of this new type of engine is proportionate to pressure rather than to volume, the criterion of the type being definitely fixed by the fact that the mechanical amplifying means in connection with short piston stroke is necessary for most effective operation, as distinguished from a type of motor or ram having a piston stroke sufficiently long to permit ordinary crank-connection. Generally, the length of the piston stroke in my type of engine is but a fraction of the piston diameter; it being permissible, of course, to make the piston diameter considerably greater than that disclosed in Figs. 1-2, or to provide a longer stroke, or both. The diameter of the pistons employed may be varied for different conditions of use. Larger diameters of pistons may be employed in the forms of Figs. 1-3 to provide motors of higher power.

In Fig. 3 is shown (in end elevation, partly in section, like Fig. 1) an embodiment in an opposed form of the new water-motor, embodying the principles of the invention embodied in the form of Figs. 1-2, but showing a construction causing each piston to act against the other, successively in opposite directions. (Only two opposed pistons are shown, but a set of several pistons acting in one direction may be employed with a set of several pistons acting in the opposite direction.) This form, like that of Figs. 1-2, has been manufactured and now is in successful practical use. In Fig. 3, as in Figs. 1-2, an amplifying transmission is provided between each short-stroke piston and crank shaft S, such transmission being located in this case between the opposite pistons; but only one crank X1 and one pitman W are necessary (as distinguished from the single one for each piston in Figs. 1-2) as shown, because levers V1 and V2 in this case are connected rigidly together at their pivoted ends, this construction being possible in this opposed type. In operation, first, piston P1 (at left) having its power stroke toward the right, operates on shaft S and also to give the back stroke to piston P2 at the right. Then piston P2 is given its power stroke toward the left and operates on shaft S and also to give the back stroke to piston P2 (levers V1 and V2 being rigid together as stated).

Also in Fig. 3 a fly-wheel FW is provided as necessary when there are only two pistons opposite to one another (a fly-wheel is not necessary in this Fig. 3 form when there are a plurality, say four, pistons on each side of shaft S, the four on each side acting successively as in Figs. 1-2). The valve control for this opposed type of Fig. 3 is shown clearly in the drawing. In respects other than the above features of difference from Figs. 1-2, the operation of the form of Fig. 3 is the same as that of the form of Figs. 1-2.

I believe that I am the first to invent a practical light, high-speed water motor, producing power effectively and economically from low water pressure, and having any such amplifying transmission means as herein disclosed, and therefore that many and various modifications of the structures herein disclosed by way of illustration may be made within the scope of patentable novelty.

The uses of the invention are many and various.

In general, the motor hereof is practically adapted for use in lieu of small, light electric, steam and explosion motors, for whatever duties may be desired.

Whenever in the claims hereof the names water-motor or water-engine are used, it is to be understood that they include apparatus which may be operated also by other fluids under pressure.

Plainly, the claims are not to be limited to any special location of the pivot of member W1 to member V1; as the power transmitted to the crank shaft by each piston stroke is chiefly determined by the total length of member V1 and the diameter of the piston and the pressure thereon.

I particularly point out and distinctly claim the part, improvement, or combination which I claim as my invention or discovery, as follows:—

1. A mechanical amplifying system for a short stroke piston of a reciprocating engine, which comprises an amplifying member having a curved surface; a rolling contact member movable by the piston against the amplifying member to move the latter; and a mechanism having rolling contact with the curvature of the amplifying member, said curvature and mechanism being constructed to effect an amplified motion of said mechanism.

2. A mechanical amplifying system for a short stroke piston of a reciprocating engine, which comprises driver and driven members, the driven member being mounted on a motion center remote from the driver, the driver being formed with a concave curvature facing the driven member, pivoted at one side of the center of the piston and having a swinging portion extending over the end of the piston and the driven member extending from its center of motion to engagement with the concave curvature of the driver; the concave curvature of the pivoted driver and the relation between such curvature and the driven member being arranged to effect an amplified motion of the driven member.

3. A mechanical amplifying system for a short stroke piston of a reciprocating engine, which comprises driver and driven members, the driven member being mounted on a center of motion remote from the driver, the driver being pivoted and having a swinging portion formed with a concave curvature facing the driven member; a rolling member traversing the curvature of the driver; and the driven member extending from its center of motion toward the curvature of the driver and supporting the rolling member in its engagement with the curvature of the driver; the concave curvature of the pivoted driver and the relation between such curvature and the driven member being arranged to effect an amplified motion of the driven member.

4. A mechanical amplifying system for a short stroke piston of a reciprocating engine, said system being located between the engine piston and a rotary power shaft, and comprising an amplifying member having a curved surface; transmitting means connected to the power shaft and having a rolling engagement with the curved surface of said amplifying member, and a rolling device between the piston and the amplifying member.

5. A mechanical amplifying system for a short stroke piston of a reciprocating engine, comprising an amplifying member supported independently of the piston but having a portion arranged to be moved by the piston and constructed with a curved surface; and an oscillating member having rolling engagement with the curved surface of the amplifying member and connected to the crank shaft; the curvature of the amplifying member and the arrangement thereof relative to the oscillating member being designed to cause the movement of the amplifying member by the piston to effect an amplified motion of said oscillating member.

6. A mechanical amplifying system for a short stroke piston of a reciprocating engine, comprising an amplifying member pivoted at one side of the piston axis and arranged to be swung on its pivot by the movement of the piston; said amplifying member being formed with a curved surface; a power transmitting lever pivoted below a line between the piston and the power shaft and arranged at a portion remote from its pivot to have rolling engagement with the curved portion of the amplifying member; and a connection from said pivoted lever for connection with the rotary power shaft; the curvature of said amplifying member and its arrangement relative to the pivoted lever being designed to effect an amplified motion of said pivoted lever.

7. A mechanical amplifying system for a short stroke piston of a reciprocating engine, comprising an amplifying member supported independently of the piston but having a portion arranged to be moved by the piston and constructed with a curved surface; said curved surface extending across the end of the piston on both sides of the axis of motion thereof; and mechanism engaging said curved surface and connected to the shaft to be rotated by the engine.

8. A mechanical amplifying system for a short stroke piston of a reciprocating engine, wherein a power shaft is located substantially at right angles to the direction of motion of the piston, said amplifying system comprising an amplifying member mounted independently of the piston but having a portion arranged to be moved by the power stroke of the piston; and means connected to be operated by said amplifying member and connected to rotate the power shaft; said amplifying member having a concave curvature facing said operating means, and said operating means engaging said concave curvature.

9. A mechanical amplifying system for a short stroke piston of a reciprocating engine, which comprises an amplifying member constructed and arranged to be operated by the piston and formed with a concave curvature; and means engaging said curvature of the amplifying member, supported independently of the piston and crank shaft but operatively connected to the crank shaft.

10. A mechanical amplifying system for a short stroke piston of a reciprocating engine, said system being located between the engine piston and a power shaft, and comprising a curved movable amplifying member fixedly supported independently of but movable by the piston; a power shaft; and a mechanical system connected to said shaft and constructed to be operated by engagement with the curvature of said amplifying member, said curvature being formed to cause an amplified motion of said mechanism.

11. A mechanical amplifying system for a short stroke piston of a reciprocating engine, said system being located between the engine piston and a crank shaft, and comprising an amplifying member arranged to be moved by the piston and constructed with a curved surface; a pivoted lever having its lever arm in rolling engagement with the curved surface of the amplifying member and arranged to be swung on its pivot by virtue of said engagement; and a link connected to the crank of the shaft and pivoted to said pivoted lever at a point intermediate the ends of the lever.

12. A mechanical amplifying system for a short stroke piston of a reciprocating engine, said system being located between the engine piston and a power shaft, and comprising an amplifying member having a flat surface facing the piston and a curved surface facing away from the piston; a rolling contact member movable by the piston over the flat surface of the amplifying member; and mechanism located between said shaft and the curved surface of the amplifying member, said mechanism and curvature being constructed to effect amplified motion of said mechanism, and said mechanism being connected to the power shaft to cause rotation thereof by such amplified motion.

13. A mechanical amplifying transmission for a short stroke piston of a reciprocating engine, said transmission comprising a pivoted amplifying member having a portion extending to one side of the piston axis and located and arranged to be moved on the pivot by the piston, and constructed with a curved surface on said extending portion; a rolling contact device; and mechanism supporting said contact device in engagement with the amplifying member and itself constructed to be connected to operate a driven member.

14. A mechanical amplifying transmission located and connected between a power shaft and a short stroke piston of a reciprocating engine, said transmission comprising a movable amplifying member supported independently of the piston but located and arranged to be moved by the piston and extending to one side of the piston axis, and having a curved surface on said extension; and mechanism connected to rotate the power shaft and having rolling engagement with the curved surface of the amplifying member; said curvature, the construction of said mechanism, and the relative location of the mechanism and amplifying member being such as to cause the movement of the amplifying member to effect a motion of said mechanism which is an amplification of the motion of the piston.

15. A mechanical amplifying transmission located and connected between a power shaft and a short stroke piston of a reciprocating engine, said transmission comprising a movable amplifying member arranged to be moved by the piston and extending to one side of the piston axis; a rolling contact device mounted between the piston and amplifying member and causing co-operation between the piston and amplifying member; said amplifying member being formed with a curved surface on its extended portion; a second rolling contact device mounted to be movable over the curved surface of the amplifying member; said curved surface being formed to cause movement of the amplifying member by the piston via the first rolling contact device to effect a motion of said second rolling contact device which is an amplification of the stroke of the piston.

16. A mechanical amplifying transmission located and connected between a power shaft and a short stroke piston of a reciprocating engine, said transmsision comprising an amplifying member pivoted off-center from the axis of motion of the piston, extending to the opposite side of the piston axis and arranged to be swung on its pivot by the piston; said amplifying member being formed with a curved surface on said extending portion; a rolling contact device mounted to be movable over the curved surface of the amplifying member, said curvature being formed to cause a movement of the amplifying member by the piston to effect a motion of said rolling contact device which is an amplification of the stroke of the piston.

17. A mechanical amplifying transmission located and connected between a power shaft and a short stroke piston of a reciprocating engine, said transmission comprising an amplifying member mounted to be moved by the piston but supported independently thereof, extending to one side of the piston axis, and formed with a curved surface on said extending portion; and a lever pivoted off-center from the axis of motion of the piston and having at a point remote from its pivot a rolling contact with the curved surface of the amplifying member, said curved surface being formed to cause the motion of the piston and amplifying member to effect a motion of the rolling contact of said pivoted lever which is an amplification of the stroke of the piston.

18. A mechanical amplifying transmission located and connected between a power shaft and a short stroke piston of a reciprocating engine, said transmission comprising an amplifying member; a rolling contact operated by the piston against said amplifying member; said emplifying member being formed with a curved surface; and an amplified member having a rolling contact with the curved surface of the amplifying member, said curvature being formed to effect a motion of the second rolling contact which is an amplification of the motion of the piston and amplifying member.

19. A mechanical amplifying transmission for location and connection between a rotary power shaft and a reciprocatory engine piston, said transmission comprising an amplifying member pivoted at one side of a line between the centers of the piston and power shaft, extending across said line, having a curved surface on said extending portion, and mounted to be swung on its pivot by the piston; an amplified member pivoted on the same side of said line as the pivot of the amplifying member and having at a point remote from its pivot a rolling contact engaging with the curvature of the extending portion of the amplifying member, said curvature being formed to effect a motion of the rolling contact of said amplified member which is an amplification of the motion of the piston and amplifying member.

20. A mechanical amplifying transmission for location and connection between a rotary power shaft and a reciprocatory engine piston, said transmission comprising an amplifying member pivoted at one side of a line between the centers of the piston and power shaft, extending across to the other side of said line, formed with a curved surface on said extending portion and mounted to be swung on its pivot by the piston; an amplified member pivoted on the same side of said line as the pivot of the amplifying member and having at a point remote from its pivot a rolling contact with the curved surface of the amplifying member; said curvature being formed to cause the motion of the amplifying member to result in a motion of the amplified member which is an amplification of the movement of the piston and amplifying member; a crank on the power shaft; and a link pivoted at one end to said crank and at its other end to a portion of the amplified member intermediate its pivot and rolling contact.

21. A mechanical amplifying transmission for location and connection between a rotary power shaft and a reciprocatory engine piston, said transmission comprising an amplifying member pivoted at one side of a line between the centers of the piston and power shaft, extending across to the other side of said line, having a curved surface on said extending portion, and mounted to be swung on its pivot by the piston, said amplifying member having also a flat engaging surface; a rolling contact device interposed between the piston and said flat surface; an amplified member pivoted on the same side of said line as the pivot of the amplifying member and having at a point remote from its pivot a rolling contact with said extending portion of the amplifying member, the curvature of the amplifying member being formed to effect an amplified motion of the amplified member; a crank on the power shaft; and a link pivoted at one end to said crank and at its other end to a portion of the amplified member intermediate its pivot and rolling contact.

22. As an element of a mechanical amplifying transmission for a short stroke piston of a reciprocating engine, an amplifying member having a mounting independent of the piston but permitting a to-and-fro movement by the piston and having a face formed with a concave curvature, and another face opposite to the first face and constructed at a portion opposite an intermediate portion of said concave curvature to receive a thrust from the piston by which the amplifying member is given its to-and-fro movement; said concave curvature effecting an amplified movement of a body moved along the concave curvature by the movement of the amplifier itself by the thrust of the piston.

23. A mechanical amplifier for location between a short stroke piston of a reciprocating engine and a member to be operated by the piston, which comprises an amplifying member movably supported independently of the piston but having one face constructed to receive a thrust from the piston and another face constructed with a concave curvature for engagement with the member to be operated in amplification of the motion of the piston.

24. A mechanical amplifying transmission for a reciprocating short-stroke engine piston, said transmission comprising a movable amplifying member supported independently of the piston at one side of the piston-axis and having a portion movable by the piston and extending to the other side of the piston axis, said movable portion being constructed with a curved surface facing away from the piston; a rolling contact device; and mechanism supporting said contact device in engagement with the curved surface of the amplifying member and itself constructed to be connected to operate a driven member.

25. A mechanical amplifying transmission for a reciprocating short-stroke engine piston, said transmission comprising the following apparatus in location between the piston and the power shaft, i. e., an amplifying member supported independently of the piston but movable by the power stroke thereof; mechanism connected to rotate the power shaft and supported independently of the piston and of said amplifying member; but operated by the latter, said mechanism and amplifying member causing the movement of the amplifying member to effect a motion of said mechanism which is an amplification of the motion of the piston.

26. A mechanical amplifying transmission for a reciprocating short-stroke engine-piston, said transmission comprising the following apparatus in location between the piston and the power shaft, i. e., an amplifying member; a rolling contact device by which the power stroke of the piston operates said amplifying member; and amplifying mechanism also having rolling contact with said amplifying member and transmitting amplified motion to the power shaft.

27. A water motor which comprises a cylinder and a piston; an amplifying member constructed and mounted to have a to-and-fro movement, and having a face formed with a concave curvature and a face opposite thereto constructed at a portion opposite an intermediate portion of said curvature to receive a thrust from the piston by which it is given its to-and-fro movement, said concave curvature being formed to effect an amplified movement of a body moved along said curvature by means of the movement of the amplifying member by the piston.

JOHN H. STRINGHAM.